United States Patent
Lee et al.

(10) Patent No.: US 6,228,294 B1
(45) Date of Patent: May 8, 2001

(54) METHOD FOR COMPRESSION MOLDING

(75) Inventors: Hong Hee Lee, Seoul; Dal Young Kang, Kyonggi-do, both of (KR)

(73) Assignee: Hyundai Electronics Industries Co., Ltd., Ichon (JP)

(*) Notice: Subject to any disclaimer, the term of this patent is extended or adjusted under 35 U.S.C. 154(b) by 0 days.

(21) Appl. No.: 09/304,049

(22) Filed: May 4, 1999

(30) Foreign Application Priority Data

Jul. 6, 1998 (KR) .................................................. 98-27142

(51) Int. Cl.[7] .............................. B05D 5/08; B29C 33/58; B29C 43/02
(52) U.S. Cl. ............................. 264/39; 264/83; 264/322; 264/337; 264/338; 427/135; 427/248.1
(58) Field of Search ................................. 264/39, 83, 322, 264/337, 338; 427/135, 248.1

(56) References Cited

U.S. PATENT DOCUMENTS 5,827,567 * 10/1998 Molitor ................................. 427/135
6,022,503 * 2/2000 Hudkins et al. ................... 264/322 X

FOREIGN PATENT DOCUMENTS 1 937 500 * 11/1970 (DE) ..................................... 427/135

OTHER PUBLICATIONS

Stephen Y. Chou et al., "Imprint Lithography with 25–Nanometer Resolution", Science vol. 272, Apr. 5, 1996, pp. 85–87.

* cited by examiner

Primary Examiner—Leo B. Tentoni
(74) Attorney, Agent, or Firm—Fleshner & Kim, LLP

(57) ABSTRACT

A compression molding method reduces or removes adhesion property between a mold substrate and a high polymer material, which is to be imprinted with a pattern from the mold substrate. Accordingly, a pattern having increased granularity to tens of A can be obtained for application to fabrication processes of semiconductor devices and electronic products. The compression molding method can use a patterned mold and preferably a high polymer material to be imprinted with the pattern. The method can further include heating one of the mold and the high polymer material, compression-molding the mold and the high polymer material, cooling the heated one for a prescribed time and separating the high polymer material and the mold from each other.

29 Claims, 4 Drawing Sheets

METHOD FOR COMPRESSION MOLDING

BACKGROUND OF THE INVENTION

1. Field of the Invention

The present invention relates to a method for compression molding.

2. Background of the Related Art

Compression molding process has been previously used for processing high polymer material. The compression molding method is performed by making a mold of a desired pattern of metal material and then compressing a high polymer material within the mold. The high polymer material should have flowability because it should enter and fill the mold by pressure applied to the high polymer material. To ensure such flowability, a transfer path of both the mold and the high polymer material is maintained at high temperature above a glass transition temperature of the high polymer material. Once the high polymer material conforms to the mold of the desired pattern, it is cooled for a certain amount of time to eliminate flowability of the high polymer. The high polymer material is then solidified, and the mold is removed to produce the solid high polymer product having the mold pattern.

FIG. 1 is a schematic view of a related art compression molding press. The related art compression molding press will now be described.

The related art compression molding press includes a press support 1, a plate induction axis 2, an upper press plate 6, and a lower press plate 5. The press support 1 is located at the bottom of the press, and the press plate induction axis 2 is fixed to both sides of the press support 1. The upper press plate 6 and the lower press plate 5 are fixed on the press plate induction axis 2 to be opposed each other. The upper press plate 6 is fixed on the induction axis 2 and the lower press plate 5 is fixed to ascend and descend along the induction axis 2. The upper and lower press plates 5 and 6 also have the capability for internal temperature adjustment.

A mold support 8a to which a mold 9 is fixed is located on the bottom of the upper press plate 6. A test piece support 8b is fixed on the lower press plate 5 to support a test piece 10.

A pressure device 3 is fixed on the center of the upper side of the press support 1 to allow a flange 12 to reciprocate the lower press plate 5 relative to the fixed upper press plate. A pressure gauge is attached to one side of the pressure device 3 to check pressure when operating the pressure device 3.

A related art compression molding method will now be described. The related art compression molding method is performed using the related art compression molding press as shown in FIG. 1. FIGS. 2a to 2c are sectional views illustrating the related art compression molding method.

As shown in FIG. 2a, the test piece 10 on which a high polymer thin film 11 is deposited is positioned on the test piece support 8b. The mold 9 with a pattern of dots or lines of about 25 nm is positioned on the mold support 8a. Polymethylmethacrylate (PMMA) polymer is used as the high polymer thin film 11.

The mold 9 and the test piece 10 (i.e., a resist) are heated at a temperature (about 200° C.) above the glass transition temperature. As shown in FIG. 2b, the mold 9 and the test piece 10 are compressed so that the pattern of the mold 9 can be molded on the high polymer thin film 11 of the test piece 10. When the temperature of the mold 9 and the test piece 10 are decreased to reduce the PMMA below the glass transition temperature of the PMMA, the mold 9 is separated from the test piece 10. As shown in FIG. 2c, the molded high polymer thin film 11 is etched by anisotropic etching to form a final pattern.

In another related art compression molding process, a high polymer material is heated to a high temperature above its glass transition temperature. Under these circumstances, the high polymer material contacts an inner wall of a mold and adheres to a surface of the inner wall of the mold. As a result, the high polymer material is not likely to be separated from the inner wall of the mold even after this process is completed. To prevent this problem, in this related art compression molding process, a mold release agent is applied to the surface of the inner wall of the mold. Chemical materials such as organosilicon compounds are used as the related art mold release agent.

As described above, the related art compression molding methods have various disadvantages. When the dimension of the pattern is large, an adhesion property at the interface between a mold surface and a high polymer material can be removed using the organosilicon mold release agent. Disadvantageously, if the mold release agent is applied to the surface of the mold embossed or engraved with a pattern having fine granularity of 1 micron or less, the mold release agent is thicker than the dimension of the pattern so that the fine pattern on the mold becomes covered by the mold release agent. As a result, the desired fine pattern cannot be imprinted. Further, even though the pattern is transferred to the substrate, the pattern is not exactly imprinted at a desired position and dimension because of the thick mold release agent that exists on the mold surface. In addition, if related art compression molding methods are performed at high pressure, the substrate to which the pattern is to be transferred and the mold substrate may physically be damaged, so that the pattern fails to be transferred to the substrate. Finally, when the pattern transferred to the surface of the high polymer is varied or distorted with a pattern dimensioned in the range of about 1 micron, there exists no technology to remove this defect or to adjust the dimension of the pattern at such dimensions when the pattern transfer has already completed by compression molding.

The above references are incorporated by reference herein where appropriate for appropriate teachings of additional or alternative details, features and/or technical background.

SUMMARY OF THE INVENTION

An object of the present invention is directed to a compression molding method that substantially obviates one or more of the problems caused by limitations and disadvantages of the related art.

Another object of the present invention is to provide a compression molding method that obtains a fine pattern for a molded high polymer material that increases the pattern accuracy.

Another object of the present invention is to provide a compression molding method that reduces or removes adhesion on the interface between a mold substrate patterned with a pattern and a high polymer material to be imprinted with the pattern from the mold substrate.

Another object of the present invention is to provide a compression molding method that removes or reduces an adhesion property between a mold substrate and a high polymer material that is to be imprinted with a high granularity pattern to obtain a pattern having increased accuracy for application in fabrication processes of semiconductor and electronic products.

To achieve at least these objects and other advantages in a whole or in parts and in accordance with the purpose of the present invention, as embodied and broadly described, a compression molding method using a mold substrate patterned with a fine pattern for transfer to a high polymer material test piece includes the steps of heating any selected one of the mold substrate and the high polymer material compression-molding the mold substrate and the high polymer material and separating the high polymer material test piece and the mold substrate from each other after cooling the heated one of the mold substrate and the high polymer material for a prescribed time.

To further achieve at least the above objects in a whole or in parts in accordance with the present invention, a compression molding method includes fluorine-terminating a surface of the mold, compression-molding the mold and the high polymer material test piece, and separating the high polymer material test piece and the mold from each other.

To further achieve at least the above objects in a whole or in parts in accordance with the present invention, a compression molding method includes performing mono-layer chemical adsorption on a surface of a mold, compression-molding the mold substrate holding the mold and the high polymer material test piece, and separating the high polymer material test piece and the mold from each other.

To further achieve at least the above objects in a whole or in parts in accordance with the present invention, a compression molding method includes preparing a mold of high polymer having a low reactivity, compression-molding the mold and a high polymer material, and separating the high polymer material test piece and the mold from each other.

To further achieve at least the above objects in a whole or in parts in accordance with the present invention, a compression molding method includes fluorine-terminating a surface of the mold, heating one of the mold substrate and the material, compression-molding the mold substrate and the material, cooling the heated one of the mold substrate and the material for a prescribed time, separating the material and the mold from each other, and performing mono-layer chemical adsorption on a surface of the material imprinted with a pattern of the mold by compression molding.

To further achieve at least the above objects in a whole or in parts in accordance with the present invention, a compression molding method includes performing mono-layer chemical adsorption on a surface of the mold, heating one of the mold substrate and the high polymer material piece, compression-molding the mold substrate and the high polymer material test piece, separating the high polymer material test piece and the mold from each other, and performing mono-layer chemical adsorption on a surface of the high polymer material imprinted with a pattern by compression molding.

To further achieve at least the above objects in a whole or in parts in accordance with the present invention, a compression molding method includes preparing a mold of high polymer fluorine resin, heating one of the mold and high polymer material, compression-molding the mold and the high polymer material, separating the high polymer material and the mold from each other, and performing mono-layer chemical adsorption on a surface of the high polymer material imprinted with a pattern of the mold by compression molding.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

First Preferred Embodiment

Figure 1:
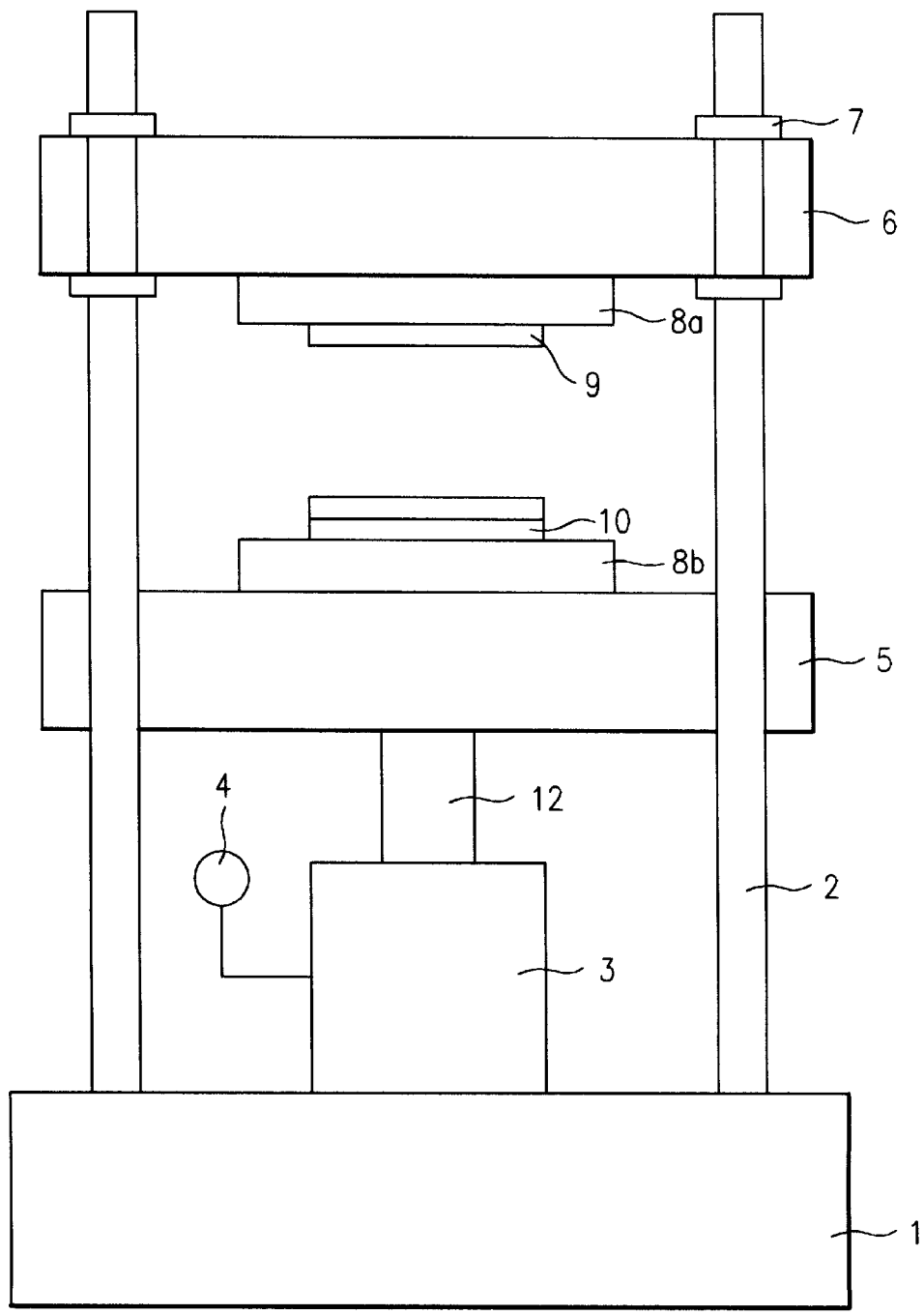
FIG. 1 is a schematic diagram illustrating a related art compression molding apparatus.
Figure 2A:
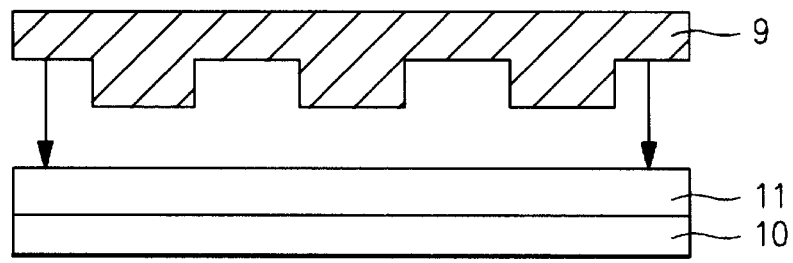
FIGS. 2a to 2c are sectional diagrams illustrating a related art compression molding method.
Figure 2B:
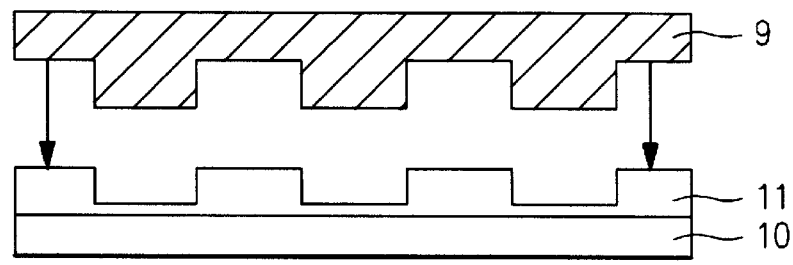
Figure 2C:

In a compression molding method according to a first preferred embodiment of the present invention, an asymmetric heating method is used. In the first preferred embodiment, any single one of a mold 9 or a test piece 10 as shown in FIG. 1 on which a high polymer thin film is deposited is heated above a glass transition temperature of the high polymer material, while the other one is compression-molded at a room temperature. After a prescribed time has elapsed, the heated one of the mold 9 and the test piece 10 is preferably quickly cooled using cooling water. An exemplary cooling time is about 2 to 20 minutes. However, the preferred embodiments are not intended to be limited to cooling using a liquid such as water. The first preferred embodiment of a method for compression molding can prevent or reduce the high polymer material to be imprinted with the pattern from adhering to the mold surface and being removed from the molded surface of the high polymer material as compared to the related art compression method in which both the mold and the test piece are heated.

Second Preferred Embodiment

Figure 3:
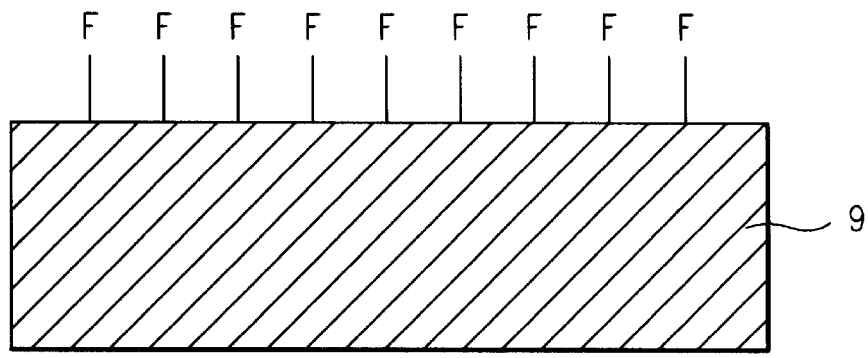
FIG. 3 is a sectional diagram of a mold illustrating a compression molding method according to a preferred embodiment according to the present invention.

In a second preferred embodiment of a compression molding method according to the present invention, fluorine termination of the mold surface is performed. As shown in FIG. 3, for fluorine termination of the mold surface, a mold 9 substrate is processed with chemicals containing a fluorine compound, for example, fluorine gas itself. However, the preferred embodiments are not intended to be so limited. The adhesion property or strength between the mold 9 surface that is processed by fluorine termination and the high polymer material is reduced or removed. Accordingly, in the second preferred embodiment compression molding method it is possible to prevent or reduce the high polymer material from being adhered on the mold surface and then being taken off out of the mold surface after completing the compression molding process.

Third Preferred Embodiment

Figure 4:
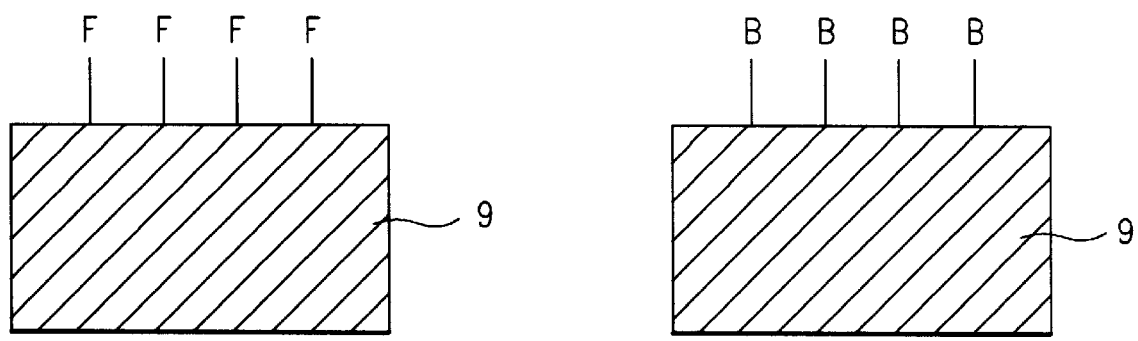
FIG. 4 is a sectional diagram of a mold illustrating a compression molding method according to another preferred embodiment according to the present invention.

A third preferred embodiment of a compression molding method according to the present invention provides monolayer chemical adsorption on the mold surface. As shown in FIG. 4, a mono-layer of chemical material that is capable of changing a property of the mold 9 surface to a hydrophilic property or a hydrophobic property is chemically absorbed on the mold 9 surface so that the high polymer material can be prevented or reduced from adhering to the mold surface by being removed from the molded surface. FIG. 4 illustrates an exemplary mono-layer chemical adsorption of Boron (B) or Flourine (F).

Fourth Preferred Embodiment

In a fourth preferred embodiment of a compression molding method according to the present invention, a high polymer material such as fluorine resin having small reaction with organic or inorganic materials is preferably used as a mold substrate. For example, according to the fourth preferred embodiment polytetrafluorethylene (PTFE) is used as a mold 9 substrate. However, the preferred embodiments are not intended to be so limited. If the PTFE mold substrate is used for the compression molding process in the fourth preferred embodiment, it is possible to reduce or prevent the high polymer material that is to be imprinted with a fine pattern from adhering to the mold surface and being removed from the molded surface of the high polymer material.

Fifth Preferred Embodiment

Figure 5:
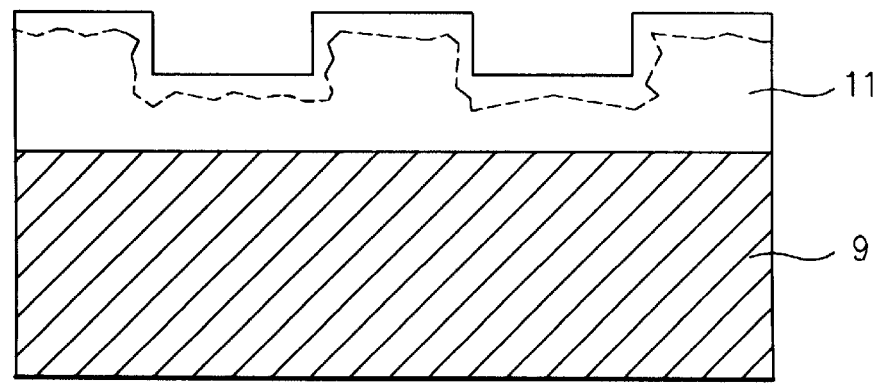
FIG. 5 is a sectional diagram of a high polymer material illustrating a compression molding method according to another preferred embodiment according to the present invention.

In a fifth preferred embodiment of a compression molding method according to the present invention, a mono layer is preferably chemically absorbed on a surface of the high polymer material imprinted with a fine pattern by compression molding to complete an incomplete pattern. For example, the imprinted high polymer material could be formed in the same manner as described above with respect to the first, second, third, and fourth preferred embodiments according to the present invention. When the pattern having very small dimension is imprinted on the surface of the high polymer material 11 by compression molding, the transferred pattern may be incomplete as shown by the dotted line of FIG. 5. At this time, the incomplete portion of the pattern can be completed according to the fifth preferred embodiment by processing chemicals by mono-layer chemical adsorption.

Sixth Preferred Embodiment

Figure 6:
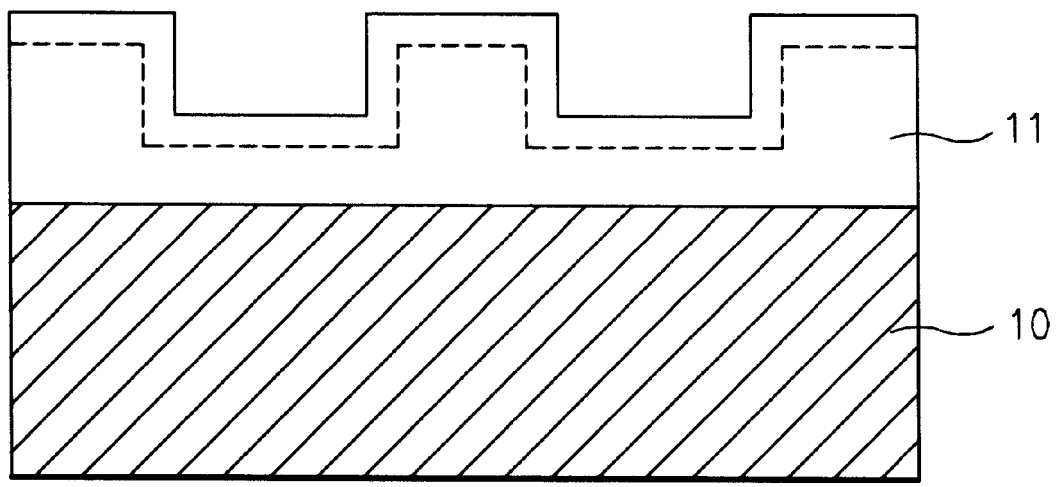
FIG. 6 is a sectional diagram of a high polymer material illustrating a compression molding method according to another preferred embodiment according to the present invention.

In a sixth preferred embodiment of a compression molding method according to the present invention, a dimension of a transferred pattern can be adjusted by processing mono-layer chemical adsorption material on the high polymer material surface to which the pattern is transferred. As an example of chemical bonding, there is a method of grafting acrylic acid upon amide. As shown by the dotted line of FIG. 6, when the pattern having very small dimension is imprinted on the surface of the high polymer material 11 by compression molding according to the sixth preferred embodiment, the dimensions (e.g., thickness) of the transferred pattern can precisely be adjusted at a level of several tens of Å level, for example, using chemicals by mono-layer chemical adsorption. However, the preferred embodiments according to the present invention are not intended to be so limited.

In addition, according to the present invention, if the above described preferred embodiments are used in combination, increasingly accurate and reliable compression molding methods can be performed. In other words, if fluorine termination of the mold surface is performed according to the second preferred embodiment and then asymmetric heating is performed according to the first preferred embodiment, it is increasingly possible to prevent or reduce the high polymer material from adhering to the mold surface and then being removed from the molded surface during separation. Alternatively, the mold surface can be processed in accordance with the third preferred embodiment, and then the asymmetrical heating can be performed in accordance with the first preferred embodiment. Further, the first through fourth preferred embodiments of the compression molding method or combinations thereof can be performed using the processes of the fifth preferred embodiment and the sixth preferred embodiment together after the pattern is imprinted on the surface of the high polymer material.

As described above, the preferred embodiments of a compression molding method according to the present invention have various advantages. The compression molding methods according to the preferred embodiments can reduce or prevent adherence of a molded surface to the mold even for high granularity patterns. Thus, compression molding according to the preferred embodiments can be performed to a level pattern dimensioned less than one micron, and repaired or modified to dimensions approaching at least tens of Å. Since the compression molding according to the preferred embodiments is performed so that the mold and the test piece are heated asymmetrically or the mold is made of fluorine resin, it is possible to completely prevent the high polymer material from being attached on the mold surface and removed from the molded surface. Accordingly, a pattern transfer can be performed using an ultra fine pattern applicable to fabrication process of a semiconductor as compared to the mold release agent of the related art compression molding process that is not applicable to a fabrication process of a semiconductor using a fine pattern. A pattern of a desired dimension can be perfectly imprinted on a desired position using the preferred embodiments according to the present invention. In addition, it is possible to complete an incomplete pattern and adjust a dimension of an imprinted fine pattern process using preferred embodiments according to the present invention by processing a surface of the high polymer material with mono-layer chemical adsorption material, where the pattern transfer has already been completed.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for compression molding, the method comprising:

heating only a selected one of a mold substrate having a pattern and a high polymer material;

compression-molding the mold substrate and the high polymer material; and separating a high polymer material test piece and the mold from each other after cooling the selected one for a prescribed time.

2. The method of claim 1, further comprising performing mono-layer chemical absorption on an imprinted surface of the high polymer material test piece formed from the high polymer material to complete an incomplete pattern.

3. The method of claim 2, further comprising performing mono-layer chemical absorption on the surface of the high polymer material test piece imprinted with the pattern to adjust a dimension of the imprinted pattern.

4. The method of claim 1, further comprising performing mono-layer chemical absorption on a surface of the high polymer material imprinted with the pattern to adjust a dimension of the imprinted pattern.

5. The method of claim 1, further comprising water-cooling the selected one for the prescribed time, and wherein the pattern includes approximately 10 Å dimensions.

6. A method for compression molding for use in semiconductor device fabrication using a mold having a fine pattern and a high polymer material semiconductor substrate test piece to be imprinted with the fine pattern, the method comprising:

fluorine-terminating a surface of the mold;

compression-molding the mold and the high polymer material semiconductor substrate test piece; and separating the high polymer material semiconductor substrate test piece and the mold from each other.

7. The method of claim 6, further comprising performing mo:no-layer chemical absorption on a surface of the high polymer material test piece imprinted with the pattern to complete an incomplete pattern.

8. The method of claim 6, further comprising performing mono-layer chemical absorption on a surface of the high polymer material test piece imprinted with the pattern to adjust a dimension of the imprinted pattern.

9. A method for compression molding using a mold substrate having a pattern and a high polymer material test piece to be imprinted with the pattern, the method comprising:

performing mono-layer chemical absorption on a surface of a mold;

compression-molding the mold substrate holding the mold and the high polymer material test piece; and separating the high polymer material test piece and the mold from each other.

10. The method of claim 9, wherein the mono-layer chemical absorption causes the mold surface to have at least one of a hydrophilic property and a hydrophobic property.

11. The method of claim 9, further comprising performing mono-layer chemical absorption on a surface of the high polymer material imprinted with the pattern to complete an incomplete pattern.

12. The method as claimed in claim 9, further comprising performing monolayer chemical absorption on a surface of the high polymer material imprinted with the pattern to adjust a dimension of the imprinted pattern.

13. A method for compression molding, the method comprising:

preparing a mold of high polymer having a low reactivity;

compression-molding the mold and a high polymer material; and separating the high polymer material and the mold from each other.

14. The method of claim 13, wherein the high polymer mold is fluorine resin.

15. The method of claim 13, further comprising performing mono-layer chemical absorption on a surface of the high polymer material imprinted with the pattern to complete an incomplete pattern.

16. The method of claim 13, further comprising performing mono-layer chemical absorption on a surface of the high polymer material imprinted with the pattern to adjust a dimension of the imprinted pattern.

17. A method for compression molding using a mold and a material to be imprinted by the mold, the method comprising:

fluorine-terminating a surface of the mold having a pattern;

heating one of the mold and the material;

compression-molding the mold substrate and the material;

cooling the heated one of the mold and the material for a prescribed time;

separating the material and the mold from each other; and performing mono-layer chemical absorption on a surface of the material imprinted with the pattern of the mold by compression molding.

18. A method for compression molding using a mold substrate supporting a patterned mold and a high polymer material piece to be imprinted with the pattern, the method comprising:

performing mono-layer chemical absorption on a surface of the mold;

heating one of the mold substrate and the high polymer material piece;

compression-molding the mold substrate and the high polymer material piece;

separating the high polymer material piece and the patterned mold from each other; and performing mono-layer chemical absorption on a surface of the high polymer material piece imprinted with the pattern.

19. A method for compression molding, the method comprising:

preparing a mold of high polymer fluorine resin;

heating one of the mold and a high polymer material;

compression-molding the mold and the high polymer material;

separating the high polymer material and the mold from each other; and performing mono-layer chemical absorption on a surface of the high polymer material imprinted with a pattern of the mold.

20. The method of claim 1, wherein the other one of the mold substrate and the high polymer material is not heated prior to being subjected to the compression-molding.

21. The method of claim 1, wherein the other one of the mold substrate and the high polymer material is subjected to the compression-molding at ambient temperature.

22. The method of claim 1, wherein the compression molding is for semiconductor fabrication, and wherein the high polymer material is a resist film on a semiconductor substrate.

23. The method of claim 6, wherein the high polymer material semiconductor substrate test piece is a resist film on a semiconductor substrate.

24. A method for compression molding, the method comprising:

compression-molding a mold substrate having a pattern and a high polymer material;

separating a high polymer material test piece and the mold substrate from each other; and performing mono-layer chemical absorption on an imprinted surface of the high polymer material test piece formed from the high polymer material to complete an incomplete pattern.

25. The method of claim 24, further comprising performing mono-layer chemical absorption on the surface of the high polymer material test piece imprinted with the pattern to adjust a dimension of the imprinted pattern.

26. The method of claim 24, further comprising heating only a selected one of the mold substrate and the high polymer material.

27. A method for compression molding, the method comprising:

compression-molding a mold substrate having a pattern and a high polymer material;

separating a high polymer material test piece and the mold substrate from each other; and performing mono-layer chemical absorption on a surface of the high polymer material test piece imprinted with the pattern to adjust a dimension of the imprinted pattern.

28. The method of claim 27, further comprising heating only a selected one of the mold substrate and the high polymer material.

29. The method of claim 27, further comprising fluorine-terminating a surface of the mold substrate.

* * * * *